United States Patent
Cariello

(10) Patent No.: US 12,379,991 B2
(45) Date of Patent: *Aug. 5, 2025

(54) ERROR DETECTION EVENT MECHANISM

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/564,843

(22) Filed: Dec. 29, 2021

(65) Prior Publication Data

US 2022/0237079 A1   Jul. 28, 2022

Related U.S. Application Data

(60) Provisional application No. 63/140,666, filed on Jan. 22, 2021.

(51) Int. Cl.
*G06F 11/00* (2006.01)
*G06F 11/07* (2006.01)
*G06F 11/10* (2006.01)
*G06F 11/362* (2025.01)

(52) U.S. Cl.
CPC ...... *G06F 11/1068* (2013.01); *G06F 11/0757* (2013.01); *G06F 11/0772* (2013.01); *G06F 11/0793* (2013.01); *G06F 11/3656* (2013.01)

(58) Field of Classification Search
CPC ............ G06F 11/1068; G06F 11/0757; G06F 11/0772; G06F 11/0793; G06F 11/3656; G06F 11/079
See application file for complete search history.

(56) References Cited

U.S. PATENT DOCUMENTS

| | | | |
|---|---|---|---|
| 2007/0171739 A1* | 7/2007 | Kim | G11C 29/38 365/201 |
| 2019/0278651 A1* | 9/2019 | Thornley | G06F 11/0787 |
| 2020/0081631 A1 | 3/2020 | Schaefer et al. | |
| 2020/0387449 A1 | 12/2020 | Simionescu et al. | |

* cited by examiner

*Primary Examiner* — Katherine Lin
(74) *Attorney, Agent, or Firm* — Holland & Hart LLP

(57) ABSTRACT

Methods, systems, and devices for error detection event mechanism are described. The memory system may identify a fault condition and transmit, to a host system, a message indicating a first indication that the fault condition exists at the memory system. In some cases, the memory system may set, in a register of the memory system, a second indication indicating a type of the fault condition based on identifying the fault condition. The memory system may perform a recovery procedure based on the first indication and the second indication.

9 Claims, 6 Drawing Sheets

| Message 300 | | | |
|---|---|---|---|
| 0<br><br>xx10 000 1b | 1<br><br>Flags | 2<br><br>LUN | 3<br><br>Task Tag |
| 4<br>IID \| Command Set Type | 5<br><br>Reserved | 6<br><br>Response | 7<br><br>Status |
| 8<br><br>Total EHS Length | 9  Indicator 315<br>Device Information | 10   (MSB)<br><br>Data Segment Length | 11   (LSB) |
| 12   (MSB) | 13 | 14 | 15   (LSB) |
| Transfer Count 310 | | | |
| 16 | 17 | 18 | 19 |
| Reserved | | | |
| 20 | 21 | 22 | 23 |
| Reserved | | | |
| 24 | 25 | 26 | 27 |
| Reserved | | | |
| 28 | 29 | 30 | 31 |
| Reserved | | | |
| Header E2ECRC (omit HE=0) | | | |
| k   (MSB)<br><br>Sense Data Length | k+1   (LSB) | k+2<br><br>Sense Data[0] | k+3<br><br>Sense Data[1] |
| ... | ... | ... | ... |
| k+16<br><br>Sense Data[14] | k+17<br><br>Sense Data[15] | k+18<br><br>Sense Data[16] | k+19<br><br>Sense Data[17] |
| Header E2ECRC (omit DD=0) | | | |

(Bracket 305 encompasses rows 0–11)

FIG. 3

| Mode Value 405 | Fault Condition Status 410 | Message Description 415 | Byte ID 420 | Use 425 | Data Length 430 | Bit ID 435 |
|---|---|---|---|---|---|---|
| 0Eh | Exception Event Status | Read Only | 2 bytes | D | 0000h | Bit 0: DYNCAP_NEEDED<br>Bit 1: SYSPOOL_EXHAUSTED<br>Bit 2: URGENT_BKOPS<br>Bit 3: TOO_HIGH_TEMP<br>Bit 4: TOO_LOW_TEMP<br>Bit 5: WRITEBOOSTER_FLUSH<br>Bit 6: PERFORMANCE_THROTTLING<br>Bit 7-15: Reserved |

ERROR DETECTION EVENT MECHANISM

CROSS REFERENCE

The present Application for Patent claims the benefit of U.S. Provisional Patent Application No. 63/140,666 by Cariello et al., entitled "ERROR DETECTION EVENT MECHANISM," filed Jan. 22, 2021, assigned to the assignee hereof, and expressly incorporated by reference herein.

FIELD OF TECHNOLOGY

The following relates generally to one or more systems for memory and more specifically to error detection event mechanism.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIG. 3 illustrates an example of a message that supports error detection event mechanism in accordance with examples as disclosed herein.

DETAILED DESCRIPTION

Figure 1:
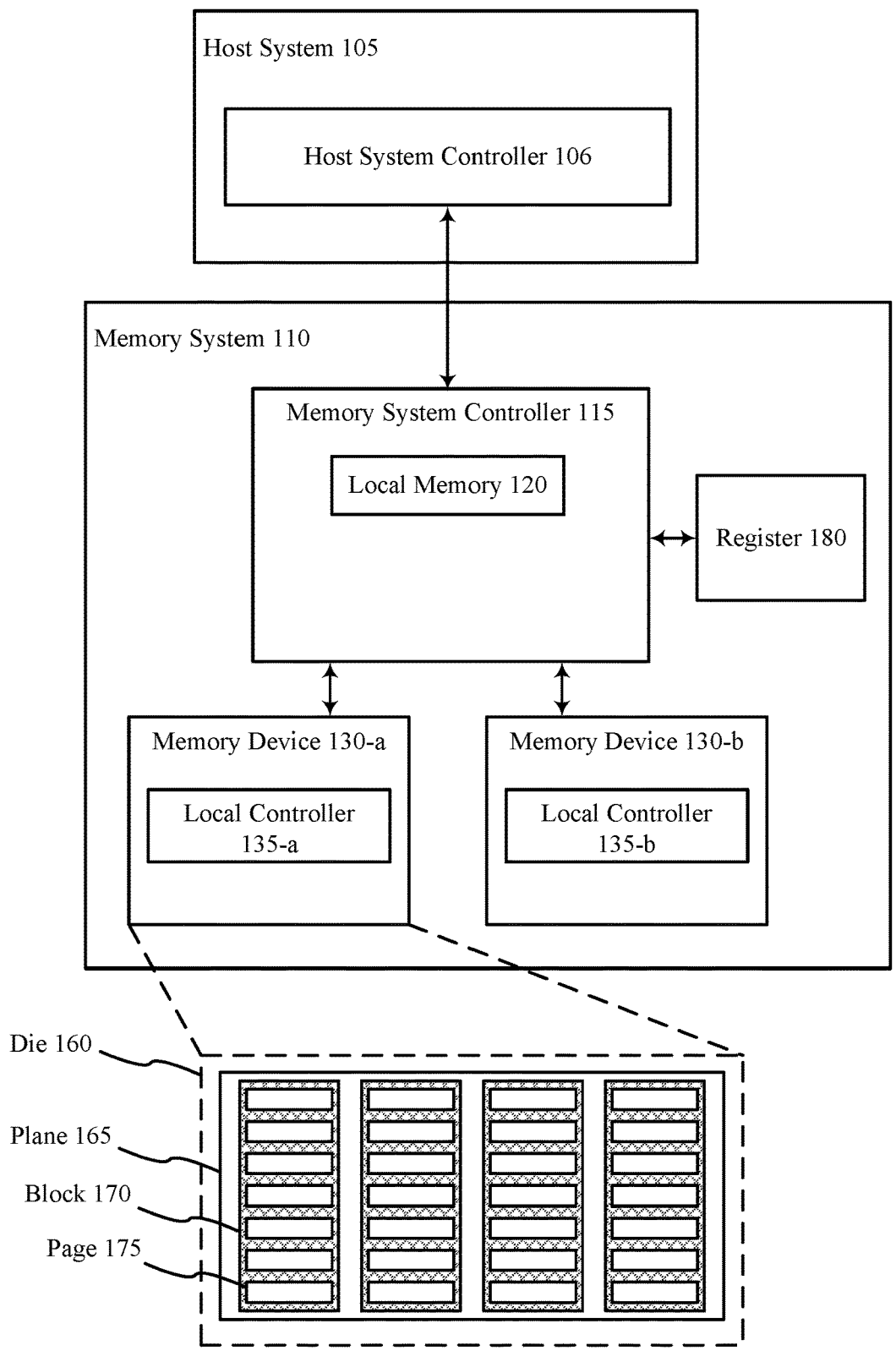
FIG. 1 illustrates an example of a system that supports error detection event mechanism in accordance with examples as disclosed herein.

A memory system may experience a fault condition associated with performing an operation of the memory system. After the memory system detects the fault condition, the memory system may be unable to alert the host system of the fault condition. When the fault condition occurs, the software or firmware (or hardware) of the memory system may cease functioning as expected (or may be hung-up). If the memory system goes for a period of time without performing expected functions, the system may enter a time-out condition and trigger a recovery procedure. For example, the fault condition (e.g., a message indicating the fault condition) may not be communicated to the host system, but rather the host system may perform a system check or remedial measures on the memory system. Once the time-out condition occurs, the host system may perform remedial operations (e.g., force hardware reset or perform a power cycle to the memory system) to cure the fault condition that may ail the memory system. In some cases, the memory system may retrieve debug information (e.g., an error history) to identify the fault condition but, the memory system may be unable to alert the host system of the fault condition. Identifying the fault condition without notifying the host system may decrease the efficiency of the memory system and increase a quantity of issues that may remain unaddressed, thereby decreasing the overall performance of the memory system and increasing a quantity of hardware and software complications associated with the memory system.

Identifying fault conditions of the memory system without communicating the fault condition to the host system may increase the risk of hacking and other compromises to the system as a whole, which may have a variety of consequences including theft of information from the system, failure of various sub-systems of the system, increasing the power consumption, decreasing the efficiency and start-up time of performing operations (e.g., a lag time for application start-up), and decreasing the overall performance of the memory system. For example, the host system may be unresponsive or unaware of the status (e.g., state) of the memory system, which may allow the memory system to continue performing operations after the fault condition occurs, thereby increasing a quantity of complications caused by corrupted code and data. Such cases may pose a threat to the security and safety of the memory system.

Systems, devices, and techniques are described to improve security and safety of the memory system, thereby improving the overall efficiency and operations of the memory system. In some memory systems, techniques for providing a real-time update (e.g., message) to the host system upon detecting the fault condition are disclosed, thereby avoiding a time-out condition where the host system may check the memory system for errors. By communicating the fault condition, the host system may be able to take remedial action before the time-out condition occurs, thereby improving the latency associated with a fault condition. The memory system may transmit, to the host system, the message to indicate that the fault condition exists at the memory system. In some cases, the memory system may set, in a register associated with the memory system, information about a type of the fault condition or an indication indicating that a fault condition exists at the memory system or both. The memory system may perform a recovery procedure based on the message indicating that the fault condition exists and the type of fault condition. In some examples, transmitting the message to the host system and setting an information in the register may increase the reliability and security of the memory system, thereby allowing the memory system or other components to perform operations at improved speeds, efficiency, and performance.

Features of the disclosure are initially described in the context of systems as described with reference to FIG. 1. Features of the disclosure are described in the context flow diagrams, messages, and tables as described with reference to FIGS. 2-4. These and other features of the disclosure are further illustrated by and described with reference to an apparatus diagram and a flowchart that relate to error detection event mechanism as described with reference to FIGS. 5-6.

FIG. 1 illustrates an example of a system 100 that supports error detection event mechanism in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA)controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support error detection event mechanism. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The memory system may include a register 180. In some cases, the register 180 may store an indication (e.g., first indication) that indicates that a fault condition exists at the memory system 110. The register 180 may store an indication (e.g., second indication) that indicates a type of fault condition that exists at the memory system 110. The register 180 may be coupled with and communicate with the memory system controller 115. The register 180 may be accessible by the host system 105 such that information in the register 180 may be read by both the host system 105 and the memory system 110. In some cases, the register 180 can be written to by the host system 105, the memory system 110, or both.

In other systems, the fault condition may not be communicated to the host system 105, but rather the host system 105 may perform a system check on the memory system 110 during a time-out condition. Once the time-out condition occurs, the host system 105 may perform remedial operations (e.g., perform a power cycle to the memory system 110) to address the fault condition. In such cases, the time-out condition may indicate, to the host system 105, that the host system 105 may check the memory system 110 for errors. In some cases, the time-out condition may indicate, to the host system 105, to abort a command in transmission, thereby preventing the operation from occurring.

Performing system checks and remedial operations without identifying the fault condition may decrease the efficiency of the memory system 110, thereby decreasing the overall performance of the memory system 110. In some cases, the memory system 110 may be unable to obstruct the code associated with the fault condition. In such cases, techniques may be desired to manage a protocol and obstruct the code to send, to the host system 105, an interrupt signal (e.g., message) that indicates the fault condition.

In some examples, the memory system 110 may communicate a presence of a particular condition (e.g., fault condition) that may affect the performance of the memory system 110. For example, the memory system 110 may identify a fault condition of the memory system 110. The fault condition may be associated with performing an operation (e.g., high or low temperature, write booster full, etc.). The memory system 110 may transmit, to the host system 105, a message indicating a first indication that the fault condition exists at the memory system. For example, the memory system 110 may set an event alert bit and upload additional information associated with the event alert bit to a register. Alternatively, the memory system 110 may set an event alert bit in the register 180 and may not send the separate message (e.g., over a channel). In response to identifying the fault condition and transmitting the message, the memory system 110 may set, in the register 180 associated with the memory system 110, a second indication indicating a type of the fault condition. The memory system 110 may perform a recovery procedure based on the first indication and the second indication. The recovery procedure may be an example of a power cycle. By transmitting the message to the host system 105 and setting the register 180, the memory system 110 may experience increased recovery times in response to a fault condition and an increased efficiency in preventing future fault conditions.

Figure 2:
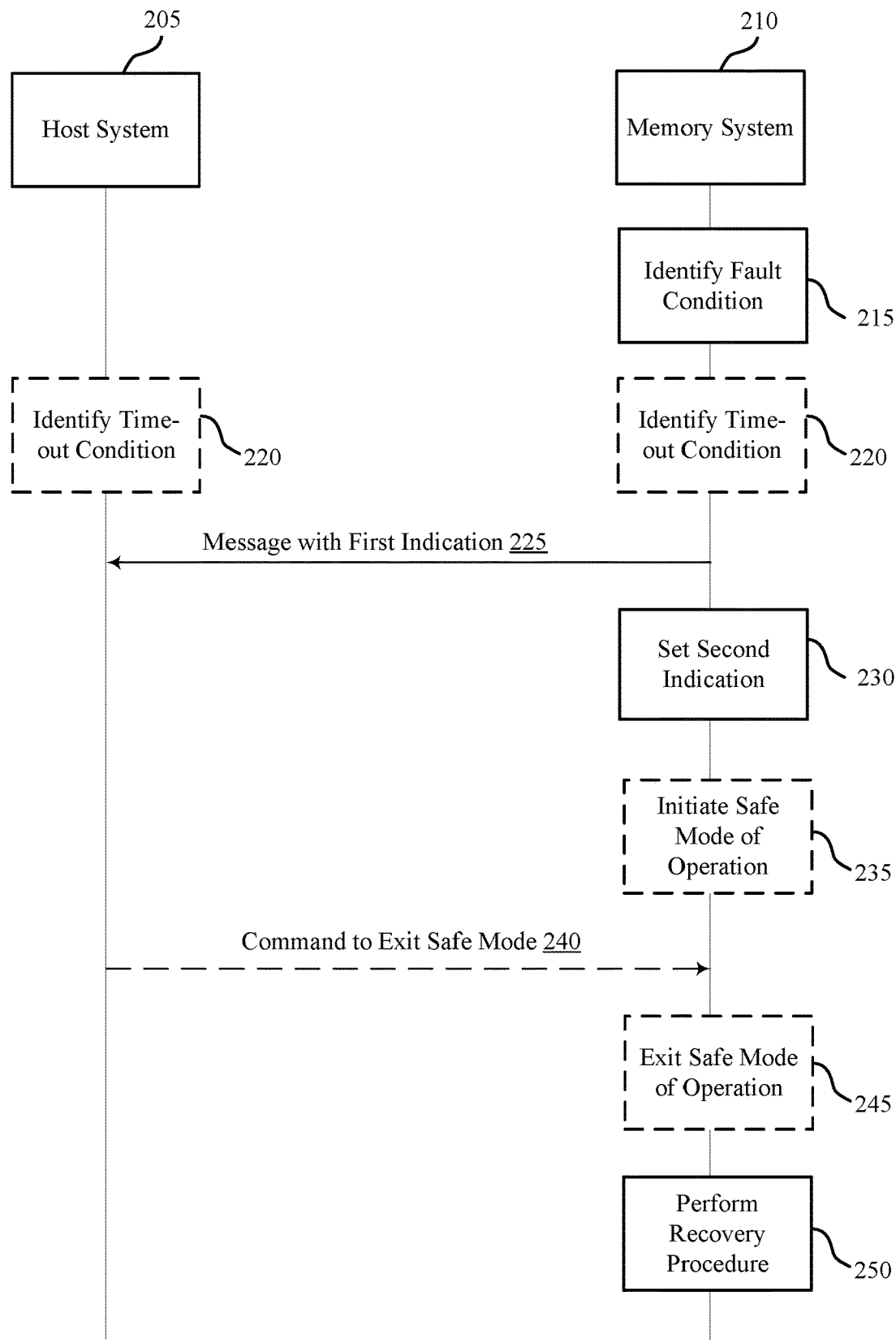
FIG. 2 illustrates an example of a flow diagram that supports error detection event mechanism in accordance with examples as disclosed herein.

FIG. 2 illustrates an example of a flow diagram 200 that supports error detection event mechanism in accordance with examples as disclosed herein. Flow diagram 200 may include host system 205 and memory system 210, which may be respective examples of a host system 105 and memory system 110 as described in reference to FIG. 1. Alternative examples of the following may be implemented, where some steps are performed in a different order or not at all. Some steps may additionally include additional features not mentioned below. The flow diagram 200 illustrates techniques where a host system 205 communicates fault conditions to the memory system 210.

Aspects of the flow diagram 200 may be implemented by a controller, among other components. Additionally or alternatively, aspects of the flow diagram 200 may be implemented as instructions stored in memory (e.g., firmware stored in a memory coupled with the memory system 210). For example, the instructions, when executed by a controller (e.g., the memory system controller 115), may cause the controller to perform the operations of the flow diagram 200.

A challenge with some memory systems is when the memory system becomes unresponsive to a host system. When the memory system because unresponsive, the host system may implement time-out operations (e.g., a reset operation or a power cycle) to reset the memory system and continue with normal operations. Memory systems may become unresponsive for a variety of reasons that may include the firmware being stuck, a hardware exception occurring, a critical operating condition of the memory system, or a fatal error in the memory system or a combination thereof.

For some fault conditions, the memory system may be configured to communicate information about the fault to the host system. In such examples, remedial operations or changes to the other operations may be implemented to fix the problem of the memory system or help the memory system avoid future problems that may be similar. In some examples, however, there may be a set of fault conditions for which the memory system may not be configured to communicate information to the host system (e.g., firmware being stuck, a hardware exception occurring, a critical operating condition of the memory system, or a fatal error in the memory system or a combination thereof). Techniques are provided for communicating information about some fault conditions to the host system from the memory system. In some examples, a message (e.g., a UPIU message) may be configured to include an indication that a fault condition has occurred and a register may be loaded with information about the fault condition.

In some cases, fault conditions may not be communicated to the host system 205, but rather the host system 205 may wait for a time-out condition to check for an issue. To address the inefficiencies associated with bypassing communication to the host system 205 regarding the fault condition, the memory system 210 may communicate to the host system 205 that the memory system 210 identifies the fault condition. For example, if the voltage of the memory system 210 drops below a threshold, the memory system 210 may transmit an indication the host system 205 and set an indication in a register of the memory system 210. In such cases, the memory system 210 may address the fault condition at the time of the occurrence and prevent future fault conditions from occurring.

At 215, a fault condition may be identified. For example, the memory system 210 may identify the fault condition. The fault condition may be an example of a hardware exception associated with the memory system 210, a stuck condition of firmware of the memory system 210, an operating condition of the memory system 210 that satisfies a threshold, an error associated with the memory system 210, or a combination thereof. For example, the operating condition of the memory system 210 may be above or below the threshold. In some cases, the fault condition may be an example of a capacity operation of the memory system 210, a resource limitation of the memory system 210, a background operation, a temperature detection operation, a flush operation, or a combination thereof. For example, the temperature detection operation may detect a temperature that is above or below a threshold.

The memory system 210 may detect the fault condition and identify information associated with the fault condition in response to identifying the fault condition. The information associated with the fault condition may include a time at which the fault condition occurred, a duration of the fault condition, a temperature of the memory system 210, or a combination thereof. In such cases, the memory system 210 may detect the fault condition and detect additional information associated with the fault condition (i.e., temperature, time, duration) to transmit additional information to the host system 205.

In some examples, the fault condition may be an example of a bit error due to noise present in the memory system 210. For example, the memory system 210 may detect a flip bit that may not be recovered by an error detection code (ECC). In other examples, the fault condition may be an example of a voltage detection threshold. For example, the power supply may be below a threshold. In such cases, the memory system 210 may send, to the host system 205, an interrupt (e.g., message) indicating the fault condition.

At 220, a time-out condition may be identified. In some examples, the host system 205 may identify the time-out condition in response to having the memory system 210 fail to perform at least some expected action for duration of time (e.g., a time-out timer expires). For example, the host system 205 may not receive a message (e.g., response) from the memory system 210 within a duration of time, and the host system 205 may determine that the memory system 210 may be having problems or has experienced a fault condition. In some cases, the time-out condition may occur independently of identifying whether the memory system identifies a fault condition. In some examples, a host system 205 may maintain a time-out timer that may be reset after one or more operations occur. Thus, during normal operation of the memory system, the time-out timer may not expire because it is getting reset fairly frequently. If the time-out timer fails to get reset, upon expiration of the timer (e.g., the time-out condition), the host system 105 may issue a command for the memory system 210 to be reset or be power cycled. In some examples, the memory system 210 may identify the time-out condition in response to identifying the fault condition.

After the time-out condition occurs, the host system 205 may perform remedial measures (e.g., perform a power cycle on the memory system 210) to address the conditions that impede the performance of the memory system 210. However, the host system 205 may be unaware of the conditions that occurred to cause the time-out condition. In some cases, the fault condition may not be communicated to the host system 205, but rather the host system 205 may perform the time-out condition (e.g., a power cycle) to refresh the memory system 210 and perform a recovery procedure on the memory system 210.

At 225, a message may be transmitted. For example, the memory system 210 may transmit, to the host system 205, the message indicating a first indication that the fault condition exists in response to identifying the fault condition. In some cases, the memory system 210 may transmit the message in response to entering the time-out condition. In such cases, the host system 205 may receive, from the memory system 210, the message indicating the first indication. The memory system 210 may set, in the register associated with the memory system 210, the first indication in response to identifying the fault condition. The memory system 210 may transmit the message in response to setting the first indication.

The message may include an information field (e.g., device information field) that indicates the first indication. The first indication may include an event alert bit. For example, the event alert bit may be set to "1" to indicate that the fault condition exists in the memory system 210. In other examples, the event alert bit may be set to "0" to indicate that the fault condition may not exist in the memory system 210. In such cases, the memory system 210 may set the event alert bit (e.g., bit 0 in device information field of the message) to trigger a failing response to an outstanding or future command from the host system 205. The message may then be transmitted over a bus from the memory system 210 and to the host system 205 after memory system 210 sets the first indication in the register.

At 230, a second indication may be set. For example, the memory system 210 may set, in the register, the second indication in response to identifying the fault condition. The second indication may indicate a type of the fault condition. In some cases, the second indication may indicate the information associated with the fault condition. For example, a bit may be set to indicate the type of fault condition and information associated with the fault condition. In some examples, the second indication may be set in response to transmitting the message. In some examples, the second indication may be set before transmitting the message.

The information set in the register may indicate an occurrence of the stuck condition of the firmware of the memory system, an occurrence of the hardware exception associated with the memory system, an occurrence of an operating condition (e.g., critical operating condition) of the memory system, and an occurrence of an error associated with the memory system. In some cases, the information set in the register may indicate an occurrence of a capacity operation of the memory system, an occurrence of a resource limitation of the memory system, an occurrence of a background operation, an occurrence of a temperature detection operation, an occurrence of a flush operation, or a combination thereof.

In some cases, the memory system 210 may retrieve debugging information from a fault history report of the memory system in response to identifying the fault condition. In such cases, the memory system 210 may set the second indication in response to retrieving the debugging information. The information associated with the fault condition may be an example of the debugging information. For example, the memory system 210 may detect that a late or missing command from the host system 205 or detect noise associated with the memory system 210. In such cases, the memory system 210 may retrieve a history log of events (e.g., fault conditions) stored in a shared memory of the memory system 210. The history log may include a quantity of times the memory system 210 recovered data or a quantity of times the memory system 210 was refreshed.

At 235, a safe mode of operation may be initiated. In some examples, the memory system 210 may enter the safe mode of operation in response to transmitting the message. In some examples, the memory system 210 may enter the safe mode of operation before transmitting the message and identifying the fault condition. The safe mode of operation may be an example of a period of time that the memory system 210 may refrain from performing an operation. In such cases, the operation capabilities of the memory system 210 may be restricted. For example, the memory system 210 may refrain from performing the operation in response to initiating the safe mode of operation. The firmware of the memory system 210 may initiate the safe mode of operation after transmitting, to the host system 205 the message indicating the first indication and setting, in the register, the second indication. By the memory system 210 initiating a safe mode of operation, corruption on the SRAM, voltage drop, or other fault conditions may be contained to prevent further damage (e.g., corruption) to the memory system 210. In other examples, the host system 205 and memory system 210 may continue to communicate via a safe path (e.g., safe mode of operation) while experiencing the fault condition.

At 240, a command may be received. For example, the memory system 210 may receive, from the host system 205, the command to exit the safe mode of operation. In such cases, the host system 205 may transmit the command to exit the safe mode of operation after a duration of time expires.

At 245, the safe mode of operation may be exited. For example, the memory system 210 may exit the safe mode of operation in response to receiving the command. In some cases, the memory system 210 may exit the safe mode in response to the memory system 210 entering a power cycle. For example, the host system 205 may remove the power supply from the memory system 210, thereby initiating a power cycle within the memory system 210.

At 250, a recovery procedure may be performed. For example, the memory system 210 may perform the recovery procedure in response to transmitting the first indication and setting the second indication in the register. In some case, the memory system 210 may perform the recovery procedure in response to exiting the safe mode of operation.

In some cases, the fault condition may be a critical fault condition. The critical fault condition may be an example of a NAND error, a software anomaly, a physical layer error, or a combination thereof. The critical fault condition may not prevent the firmware from operating (e.g., allow the firmware to continue operations). In some cases, the memory system 210 and host system 205 may be able to address the critical fault condition, and the memory system 210 may be able to set (e.g., define) a separate event (e.g., indication) in a message and register. In such cases, enabling the memory system 210 to communicate the fault condition at the at the time of occurrence may prevent the host system 205 from periodically checking the error history, thereby reducing the error checking and avoiding the risk that, due to limited resources, the information may have been discarded.

In response to the message indicating that the critical fault condition exists, the memory system 210 may perform a first recovery procedure of the recovery procedure. For example, the memory system 210 may set a first bit (e.g., second indication) indicating the critical fault condition in the register. The first bit set in the register may cause the memory system 210 to perform the first recovery procedure for the critical fault condition.

In some cases, the fault condition may be a fatal fault condition. The fatal fault condition may be an example of a stuck condition, a hardware error, a software panic, or a combination thereof. Immediately signaling to the host system 205 the existence of a stuck condition (e.g., fatal fault condition) may reduce recovery time and improve the operations of the memory system 210. In some cases, the fatal fault condition may be addressed via a reset operation (e.g., recovery procedure). In such cases, the fatal fault condition may prevent the firmware from operating and cause the memory system 210 to reset.

In response to the message indicating that the fatal fault condition exists, the memory system 210 may perform a second recovery procedure of the recovery procedure. The second recovery procedure may be different than the first recovery procedure. For example, the memory system 210 may set a second bit (e.g., second indication) indicating the fatal fault condition in the register. The second bit set in the register may cause the memory system 210 to perform the second recovery procedure for the fatal fault condition. In such cases, a different bit (e.g., second bit) set in the register may result in different recovery procedures performed by the memory system 210.

By the memory system 210 transmitting the message that indicates the first indication in real-time (e.g., at the time that the fault condition occurs) and setting the second indication in the register, the memory system 210 may prevent the host system 205 from entering the time-out condition which increases inefficiencies of the memory system 210 by increasing the power and energy consumption. In some cases, providing real-time fault condition reporting may improve error management, reduce test firmware releases to detect error conditions, and allow a safe state (e.g., safe mode of operation) for the host system 205 to communicate with the memory system 210 in case a fault condition occurred. In such cases, transmitting the message to the host system 205 may accelerate the failure analysis to identify the causes of the fault condition, thereby allowing the memory system 210 to quickly address the fault condition, improve latency in error handling, and prevent future fault conditions from occurring.

FIG. 3 illustrates an example of a message 300 that supports error detection event mechanism in accordance with examples as disclosed herein. The message 300 may be an example of the message as described in reference to FIGS. 1 and 2. The message may include a header 305, a transfer count 310, and an indicator 315. The header may include device information (e.g., byte 9).

The message 300 may include information indicating the command received from the host system and a status of the memory system resulting from the execution of the command. The memory system may transmit the message 300 to the host system, after the operation is completed. In some cases, the message 300 may indicate an identified fault condition. In such cases, the memory system may modify the header 305 (e.g., device information) and other bytes to communicate the fault condition to the host system. After the memory system identifies the fault condition, the memory system may transmit the message 300 to the host system. In some cases, the message 300 may be an example of a UFS Protocol Information Unit (UPIU). In some cases, the message 300 may be an example of a response UPIU sent from a memory system to a host system.

The header 305 may include the first twelve bytes of the message 300. Each numbered box in the message 300 represents a byte of information that includes a plurality of bits. In some examples, the header 305 may include a transaction type, a flag, a memory system identification (ID), a command set type, a response, a status, a task tag, memory system information (e.g., device information in byte 9), and a data segment length. The message 300 may include an information field (e.g., device information) that includes a first indication 315. The device information may be included in the ninth byte of the message 300 and may be associated with events that may occur at the memory system. In such cases, the device information may indicate that a fault condition exists on the memory system. The device information may be associated with the fault condition and signal to the host system that the fault condition occurred. In some cases, the memory system may set the first indication in a register to indicate that the fault condition exists on the memory system.

A first bit (e.g., bit 0) of the device information may be an example of an event alert bit. For example, the event alert bit of device information may be set to "1" to indicate that the fault condition exists in the memory system (e.g., a fault condition is active). In other examples, the event alert bit may be set to "0" to indicate that the fault condition may not exist in the memory system (e.g., a fault condition is inactive). In such cases, the memory system may set the event alert bit (e.g., bit 0 in device information byte of the message 300) to trigger a failing response to the any outstanding or future command from the host system. The message 300 may then be transmitted over a bus from the memory system to the host system after memory system sets the first indication in the register. A second bit (e.g., bit 1) of the device information may be reserved for host performance booster (HPB). In some cases, the use of device information may avoid the execution of a continuous polling mechanism performed by the host system.

The message 300 may include the transfer count 310. The transfer count 310 may indicate a quantity of bytes that may not be transferred to or from the memory system. The message 300 may also include the reserved bytes that are not specified for specific uses, such as bytes 16 through 31. The message may also include other information as illustrated by bytes k through k+19 and its associated information.

The memory system may identify the fault condition and transmit the message 300 in response to identifying the fault condition. The message 300 may indicate a first indication that the fault condition exists in the memory system in the device information of the message 300. In such cases, the memory system may store, in the register of the memory system, the second indication indicating the type of fault condition. In such cases, a bit set to "1" in the device information (e.g., the first indication) of the message 300 may indicate, to the host system, to read the register and identify the type of fault condition (e.g., the second indication).

Figure 4:
FIG. 4 illustrates an example of a table that supports error detection event mechanism in accordance with examples as disclosed herein.

FIG. 4 illustrates an example of a table 400 that supports error detection event mechanism in accordance with examples as disclosed herein. The table 400 may represent bits of a register used to store a second indication and communicate additional information about a fault condition between a host system and a memory system. The table 400 may include a mode value 405, a fault condition status 410, a message description 415, a byte ID 420, use 425, data length 430, and bit ID 435.

The fault condition status 410 may include an exception event status. In some cases, a fault condition may be an example of an exception event. An exception event mechanism may be used by the memory system to report an occurrence of some events (e.g., fault conditions) to the host system. For example, the exception event mechanism may include an event alert bit, a fault condition status 410 (e.g., an exception event status attribute), and a fault condition control attribute (e.g., an exception event control attribute). A bit in the fault condition status 410 may be assigned to each fault condition. For example, a bit of the fault condition status 410 may be set to "1" to indicate that the corresponding fault condition is active (e.g., exists in the memory system). The bit of the fault condition status 410 may be set to "0" to indicate that the corresponding fault condition is inactive (e.g., does not exist in the memory system).

The fault condition control attribute may include a bit that is assigned to each fault condition. For example, the bit in the fault condition control attribute and a bit in the fault condition status 410 may both be set to "1." In such cases, the event alert bit included in the device information field of the message may be set to "1." In other examples, the bit in the fault condition control attribute may be set to "0," and the bit in the fault condition status 410 may be set to "1." In such cases, the event alert bit included in the device information field of the message may be set to "0."

The event alert bit may be an example of the logical OR of bits in the fault condition status 410 masked by the bits of the fault condition control attribute. The event alert bit may be set to "1" in response to at least one bit in the fault condition status 410 and at least one bit in the fault condition control attribute being set to "1." After the memory system addresses the fault condition (e.g., performs a recovery procedure), the bits of the fault condition control attribute, fault condition status 410, and event alert bit may be cleared (e.g., reset).

The bit ID 435 associated with the fault condition status 410 may indicate the fault condition. Each bit in the bit ID 435 may be mapped to different fault conditions. The fault condition may be an example of an operating condition of the memory system that satisfies a threshold (e.g., a dynamic device capacity), a capacity operation of the memory system (e.g., a system pool exhausted), a background operation, a temperature detection operation, a performance throttling, and a flush operation (e.g., write booster buffer flush). For example, bit 0 of bit ID 435 may indicate that the fault condition is a dynamic device capacity. In such cases, the memory system may request a dynamic capacity operation. The bit may be cleared after the dynamic capacity operation is complete, thereby releasing the capacity of the memory system requested to be released.

In some examples, bit 1 of bit ID 435 may indicate that the fault condition is the system pool exhausted. In such cases, a quantity of resources to address host data as system data may be below a threshold. The bit may be cleared after the host system transforms a system data area of the memory system to a non-system data area. Bit 2 of bit ID 435 may indicate that the fault condition is the background operation. In such cases, the memory system may transmit a request, to the host system, during performance of a background operation. The bit may be cleared after the background operation status returns to 00h or 01h.

In other examples, bit 3 of bit ID 435 may indicate that the fault condition is the temperature detection that may be above a threshold (e.g., satisfies the threshold). In such cases, the memory system may transmit a request, to the host system, to reduce the temperature of the memory system. Bit 4 of bit ID 435 may indicate that the fault condition is the temperature detection that may be below the threshold (e.g., satisfies the threshold). In such cases, the memory system may transmit a request, to the host system, to increase the temperature of the memory system.

In some cases, bit 5 of bit ID 435 may indicate that the fault condition is the performance throttle. In such case, the memory system may operate at a reduced performance. The host system may read the fault condition status 410 and determine a cause of the reduced performance. Bit 6 of bit ID 435 may indicate that the fault condition is the write booster buffer flush. In such cases, the host system may issue a flush command, and the memory system may set a bit to "1," thereby indicating to the memory system to perform a flush operation on the buffer for the write booster.

Bits 7 through 15 may be reserved and may indicate other fault conditions. For example, bits 7 through 15 may indicate the fault condition is a hardware exception associated with the memory system, a stuck condition of firmware of the memory system, a voltage detection operation, an uncorrectable error, or a combination thereof. In some cases, bits 7-15 may be reserved and those bits can be used to communicate the additional fault conditions described herein. In some cases, at least some of bits 7-15 may be mapped to fault conditions. For example, a bit may be mapped to indicate a stuck condition of the firmware of the memory system, an occurrence of a hardware exception associated with the memory system, an occurrence of an operating condition (e.g., critical operating condition) of the memory system, and an occurrence of an error associated with the memory system. In some cases, the information set in the register may indicate an occurrence of a capacity operation of the memory system, an occurrence of a resource limitation of the memory system, an occurrence of a background operation, an occurrence of a temperature detection operation, an occurrence of a flush operation, or a combination thereof.

Figure 5:
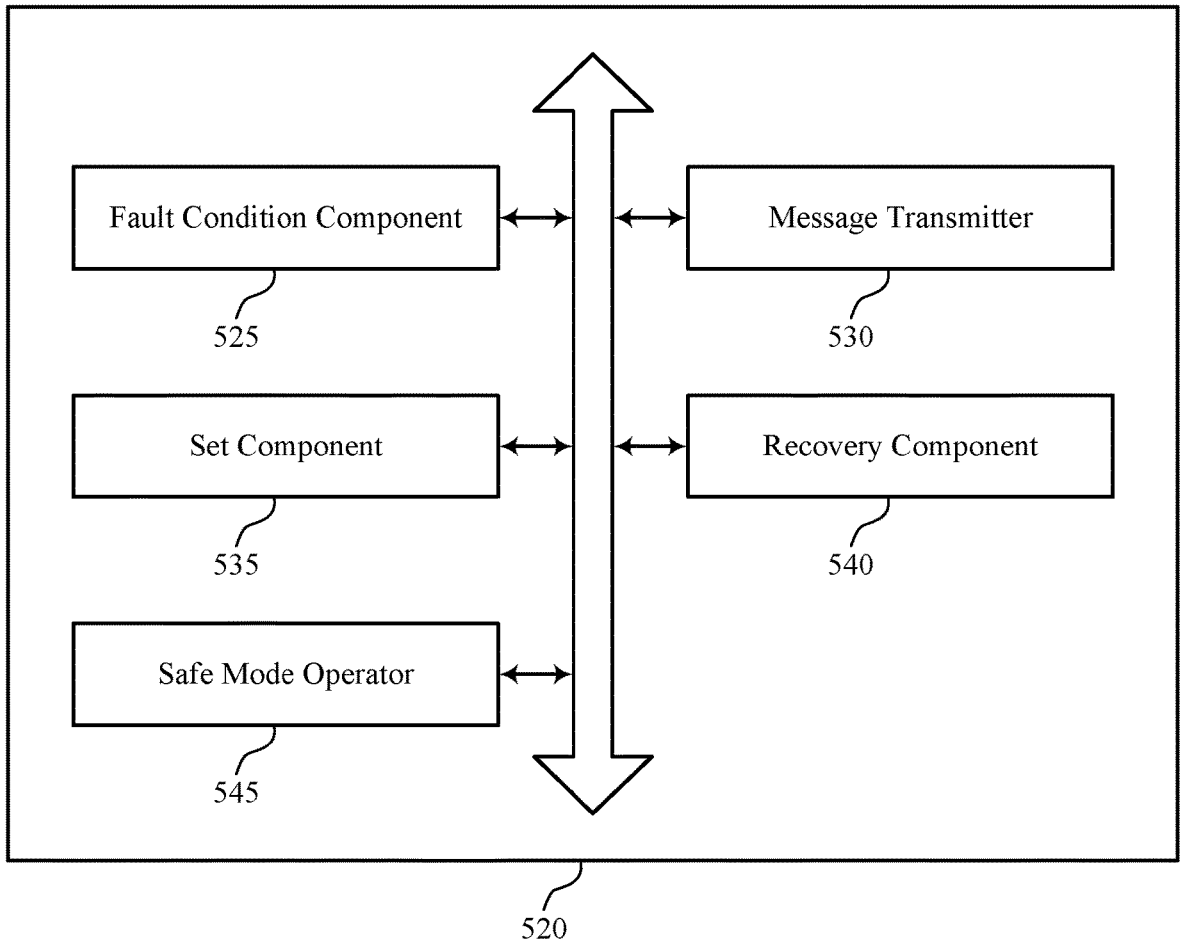
FIG. 5 shows a block diagram of a memory system that supports error detection event mechanism in accordance with examples as disclosed herein.

FIG. 5 shows a block diagram 500 of a memory system 520 that supports error detection event mechanism in accordance with examples as disclosed herein. The memory system 520 may be an example of aspects of a memory system as described with reference to FIGS. 1 through 4. The memory system 520, or various components thereof, may be an example of means for performing various aspects of error detection event mechanism as described herein. For example, the memory system 520 may include a fault condition component 525, a message transmitter 530, a set component 535, a recovery component 540, a safe mode operator 545, or any combination thereof. Each of these components may communicate, directly or indirectly, with one another (e.g., via one or more buses).

The fault condition component 525 may be configured as or otherwise support a means for identifying a fault condition of the memory system. The message transmitter 530 may be configured as or otherwise support a means for transmitting, to a host system, a message indicating a first indication that the fault condition exists at the memory system based at least in part on identifying the fault condition. The set component 535 may be configured as or otherwise support a means for setting, in a register associated with the memory system, a second indication indicating a type of the fault condition based at least in part on identifying the fault condition. The recovery component 540 may be configured as or otherwise support a means for performing a recovery procedure based at least in part on the first indication and the second indication.

In some examples, where the fault condition comprises a critical fault condition, the recovery component 540 may be configured as or otherwise support a means for performing a first recovery procedure of the recovery procedure based at least in part on the message indicating that the critical fault condition exists.

In some examples, where the fault condition comprises a fatal fault condition, the recovery component 540 may be configured as or otherwise support a means for performing a second recovery procedure of the recovery procedure based at least in part on the message indicating that the fatal fault condition exists.

In some examples, the fault condition component 525 may be configured as or otherwise support a means for entering a time-out condition based at least in part on identifying the fault condition, where transmitting the message is based at least in part on entering the time-out condition.

In some examples, the fault condition component 525 may be configured as or otherwise support a means for identifying information associated with the fault condition based at least in part on identifying the fault condition, where the second indication indicates the information associated with the fault condition.

In some examples, the set component 535 may be configured as or otherwise support a means for setting, in the register associated with the memory system, the first indication based at least in part on identifying the fault condition, where transmitting the message is based at least in part on setting the first indication.

In some examples, the fault condition component 525 may be configured as or otherwise support a means for retrieving debugging information from a fault history report of the memory system based at least in part on identifying the fault condition, where setting the second indication is based at least in part on retrieving the debugging information.

In some examples, the safe mode operator 545 may be configured as or otherwise support a means for initiating the memory system to enter a safe mode of operation based at least in part on transmitting the message. In some examples, the safe mode operator 545 may be configured as or otherwise support a means for refraining from performing an operation based at least in part on initiating the memory system to enter the safe mode of operation.

In some examples, the safe mode operator 545 may be configured as or otherwise support a means for receiving, from the host system, a command to exit the safe mode of operation. In some examples, the safe mode operator 545 may be configured as or otherwise support a means for exiting the safe mode of operation based at least in part on receiving the command, where performing the recovery procedure is based at least in part on exiting the safe mode of operation.

In some examples, the message includes an information field that indicates the first indication. In some examples, the first indication includes an event alert bit.

In some examples, the fault condition includes a hardware exception associated with the apparatus, a stuck condition of firmware of the apparatus, an operating condition of the apparatus that satisfies a threshold, a capacity operation of the apparatus, a resource limitation of the apparatus, a background operation, a temperature detection operation, a flush operation, a voltage detection operation, or a combination thereof.

Figure 6:
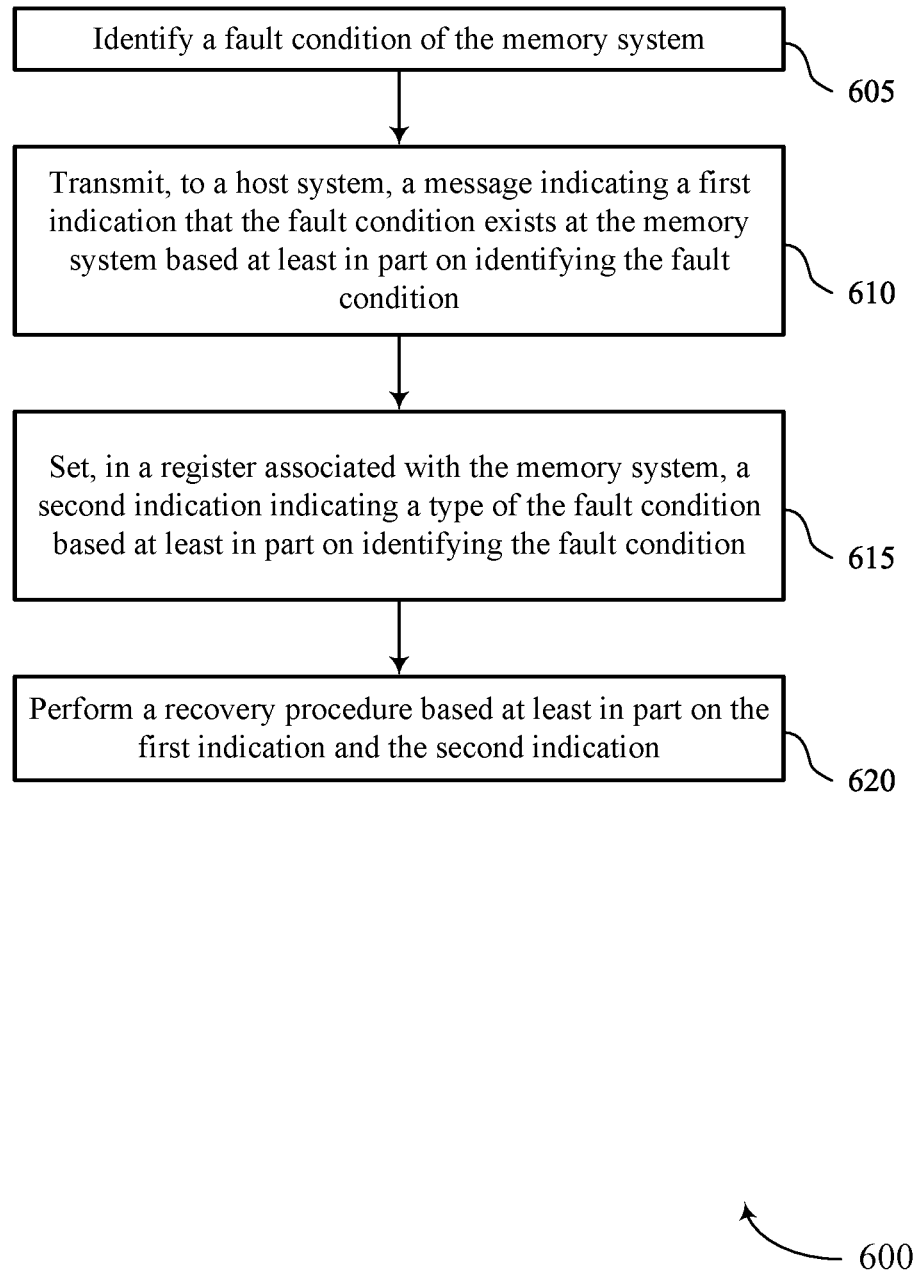
FIG. 6 shows a flowchart illustrating a method or methods that support error detection event mechanism in accordance with examples as disclosed herein.

FIG. 6 shows a flowchart illustrating a method 600 that supports error detection event mechanism in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

Aspects of the method 600 may be implemented by a controller, among other components. Additionally or alternatively, aspects of the method 600 may be implemented as instructions stored in memory (e.g., firmware stored in a memory coupled with the memory system). For example, the instructions, when executed by a controller (e.g., the memory system controller), may cause the controller to perform the operations of the method 600.

At 605, a fault condition may be identified. For example, the method may include identifying the fault condition of the memory system. The operations of 605 may be performed in accordance with examples as disclosed herein. In some examples, aspects of the operations of 605 may be performed by a fault condition component 525 as described with reference to FIG. 5.

At 610, a message may be transmitted. For example, the method may include transmitting, to a host system, the message indicating a first indication that the fault condition exists at the memory system based at least in part on identifying the fault condition. The operations of 610 may be performed in accordance with examples as disclosed herein. In some examples, aspects of the operations of 610 may be performed by a message transmitter 530 as described with reference to FIG. 5.

At 615, a second indication may be set. For example, the method may include setting, in a register associated with the memory system, the second indication indicating a type of the fault condition based at least in part on identifying the fault condition. The operations of 615 may be performed in accordance with examples as disclosed herein. In some examples, aspects of the operations of 615 may be performed by a set component 535 as described with reference to FIG. 5.

At 620, a recovery procedure may be performed. For example, the method may include performing the recovery procedure based at least in part on the first indication and the second indication. The operations of 620 may be performed in accordance with examples as disclosed herein. In some examples, aspects of the operations of 620 may be performed by a recovery component 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for identifying a fault condition of the memory system, transmitting, to a host system, a message indicating a first indication that the fault condition exists at the memory system based at least in part on identifying the fault condition, setting, in a register associated with the memory system, a second indication indicating a type of the fault condition based at least in part on identifying the fault condition, and performing a recovery procedure based at least in part on the first indication and the second indication.

In some examples of the method 600 and the apparatus described herein, and the method, apparatuses, and non-transitory computer-readable medium may include further operations, features, circuitry, logic, means, or instructions for performing a first recovery procedure of the recovery procedure based at least in part on the message indicating that the critical fault condition exists.

In some examples of the method 600 and the apparatus described herein, and the method, apparatuses, and non-transitory computer-readable medium may include further operations, features, circuitry, logic, means, or instructions for performing a second recovery procedure of the recovery procedure based at least in part on the message indicating that the fatal fault condition exists.

Some examples of the method 600 and the apparatus described herein may further include operations, features, circuitry, logic, means, or instructions for entering a time-out condition based at least in part on identifying the fault condition, where transmitting the message may be based at least in part on entering the time-out condition.

Some examples of the method 600 and the apparatus described herein may further include operations, features, circuitry, logic, means, or instructions for identifying information associated with the fault condition based at least in part on identifying the fault condition, where the second indication indicates the information associated with the fault condition.

Some examples of the method 600 and the apparatus described herein may further include operations, features, circuitry, logic, means, or instructions for setting, in the register associated with the memory system, the first indication based at least in part on identifying the fault condition, where transmitting the message may be based at least in part on setting the first indication.

Some examples of the method 600 and the apparatus described herein may further include operations, features, circuitry, logic, means, or instructions for retrieving debugging information from a fault history report of the memory system based at least in part on identifying the fault condition, where setting the second indication may be based at least in part on retrieving the debugging information.

Some examples of the method 600 and the apparatus described herein may further include operations, features, circuitry, logic, means, or instructions for initiating the memory system to enter a safe mode of operation based at least in part on transmitting the message and refraining from performing an operation based at least in part on initiating the memory system to enter the safe mode of operation.

Some examples of the method 600 and the apparatus described herein may further include operations, features, circuitry, logic, means, or instructions for receiving, from the host system, a command to exit the safe mode of operation and exiting the safe mode of operation based at least in part on receiving the command, where performing the recovery procedure may be based at least in part on exiting the safe mode of operation.

In some examples of the method 600 and the apparatus described herein, the message includes an information field that indicates the first indication, and the first indication includes an event alert bit.

In some examples of the method 600 and the apparatus described herein, the fault condition includes a hardware exception associated with the apparatus, a stuck condition of firmware of the apparatus, an operating condition of the apparatus that satisfies a threshold, a capacity operation of the apparatus, a resource limitation of the apparatus, a background operation, a temperature detection operation, a flush operation, a voltage detection operation, or a combination thereof.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. An apparatus, comprising:
   a memory device;
   a register; and
   a control circuit coupled with the memory device and configured to cause the apparatus to:
      identify a fault condition of the apparatus;
      transmit, to a host system, a message indicating a first indication that the fault condition exists at the apparatus based at least in part on identifying the fault condition;
      set, in the register, a second indication indicating a type of the fault condition based at least in part on identifying the fault condition;
      initiate the apparatus to enter a safe mode of operation based at least in part on transmitting the message;
      refrain from performing an operation based at least in part on initiating the apparatus to enter the safe mode of operation;
      receive, from the host system, a command to exit the safe mode of operation;
      exit the safe mode of operation based at least in part on receiving the command; and
      perform a recovery procedure based at least in part on the first indication and the second indication, wherein performing the recovery procedure is based at least in part on exiting the safe mode of operation.

2. The apparatus of claim 1, wherein the fault condition comprises a critical fault condition, and wherein the control circuit is further configured to cause the apparatus to:
perform a first recovery procedure of the recovery procedure based at least in part on the message indicating that the critical fault condition exists.

3. The apparatus of claim 1, wherein the fault condition comprises a fatal fault condition, and wherein the control circuit is further configured to cause the apparatus to:
perform a second recovery procedure of the recovery procedure based at least in part on the message indicating that the fatal fault condition exists.

4. The apparatus of claim 1, wherein the control circuit is further configured to cause the apparatus to:
enter a time-out condition based at least in part on identifying the fault condition, wherein transmitting the message is based at least in part on entering the time-out condition.

5. The apparatus of claim 1, wherein the control circuit is further configured to cause the apparatus to:
identify information associated with the fault condition based at least in part on identifying the fault condition, wherein the second indication indicates the information associated with the fault condition.

6. The apparatus of claim 1, wherein the control circuit is further configured to cause the apparatus to:
set, in the register, the first indication based at least in part on identifying the fault condition, wherein transmitting the message is based at least in part on setting the first indication.

7. The apparatus of claim 1, wherein the control circuit is further configured to cause the apparatus to:
retrieve debugging information from a fault history report of the apparatus based at least in part on identifying the fault condition, wherein setting the second indication is based at least in part on retrieving the debugging information.

8. The apparatus of claim 1, wherein the message comprises an information field that indicates the first indication, wherein the first indication comprises an event alert bit.

9. The apparatus of claim 1, wherein the fault condition further comprises a stuck condition of firmware of the apparatus, an operating condition of the apparatus that satisfies a threshold, a capacity operation of the apparatus, a resource limitation of the apparatus, a background operation, a temperature detection operation, a flush operation, a voltage detection operation, or a combination thereof.

* * * * *